(12) United States Patent
Viaud et al.

(10) Patent No.: US 6,886,307 B2
(45) Date of Patent: May 3, 2005

(54) LARGE ROUND BALER

(75) Inventors: Jean Viaud, Gray (FR); Jean-Francois Fournier, Gray (FR)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 10/462,045

(22) Filed: Jun. 13, 2003

(65) Prior Publication Data

US 2003/0230046 A1 Dec. 18, 2003

(30) Foreign Application Priority Data

Jun. 15, 2002 (DE) .......................................... 102 26 797

(51) Int. Cl.⁷ .............................................. B65B 63/04
(52) U.S. Cl. ........................................ 53/118; 53/587
(58) Field of Search ........................ 53/399, 441, 587, 53/384, 118, 211, 465; 100/5, 15, 87, 88

(56) References Cited

U.S. PATENT DOCUMENTS

| 4,922,690 A | * | 5/1990 | Gusewell et al. ............. 53/587 |
| 4,956,968 A | | 9/1990 | Underhill ...................... 56/341 |
| 5,020,299 A | * | 6/1991 | Underhill ...................... 53/399 |
| 5,129,207 A | | 7/1992 | Butler .......................... 53/118 |
| 5,243,806 A | | 9/1993 | Jennings et al. .............. 53/118 |
| 5,319,899 A | * | 6/1994 | Jennings et al. .............. 53/118 |
| 5,581,973 A | | 12/1996 | Underhill ...................... 53/118 |

FOREIGN PATENT DOCUMENTS

| DE | 33 31 671 | 9/1983 |
| EP | 1264533 | 11/2002 |

* cited by examiner

Primary Examiner—Stephen F. Gerrity
Assistant Examiner—Hemant M. Desai

(57) ABSTRACT

A large round baler is equipped with an enveloping arrangement that moves a run of enveloping material to the circumferential surface of a bale with a pivot arm including a driver having projections in the form of teeth that can be caused to penetrate the enveloping material to cause a positive locking with the run of enveloping material so that the enveloping material may be selectively inserted into the baling chamber at the beginning of a wrapping cycle and engaged with a contact plate to effect separation of the enveloping material once a predetermined number of wraps have been applied to the circumference of the bale.

4 Claims, 5 Drawing Sheets

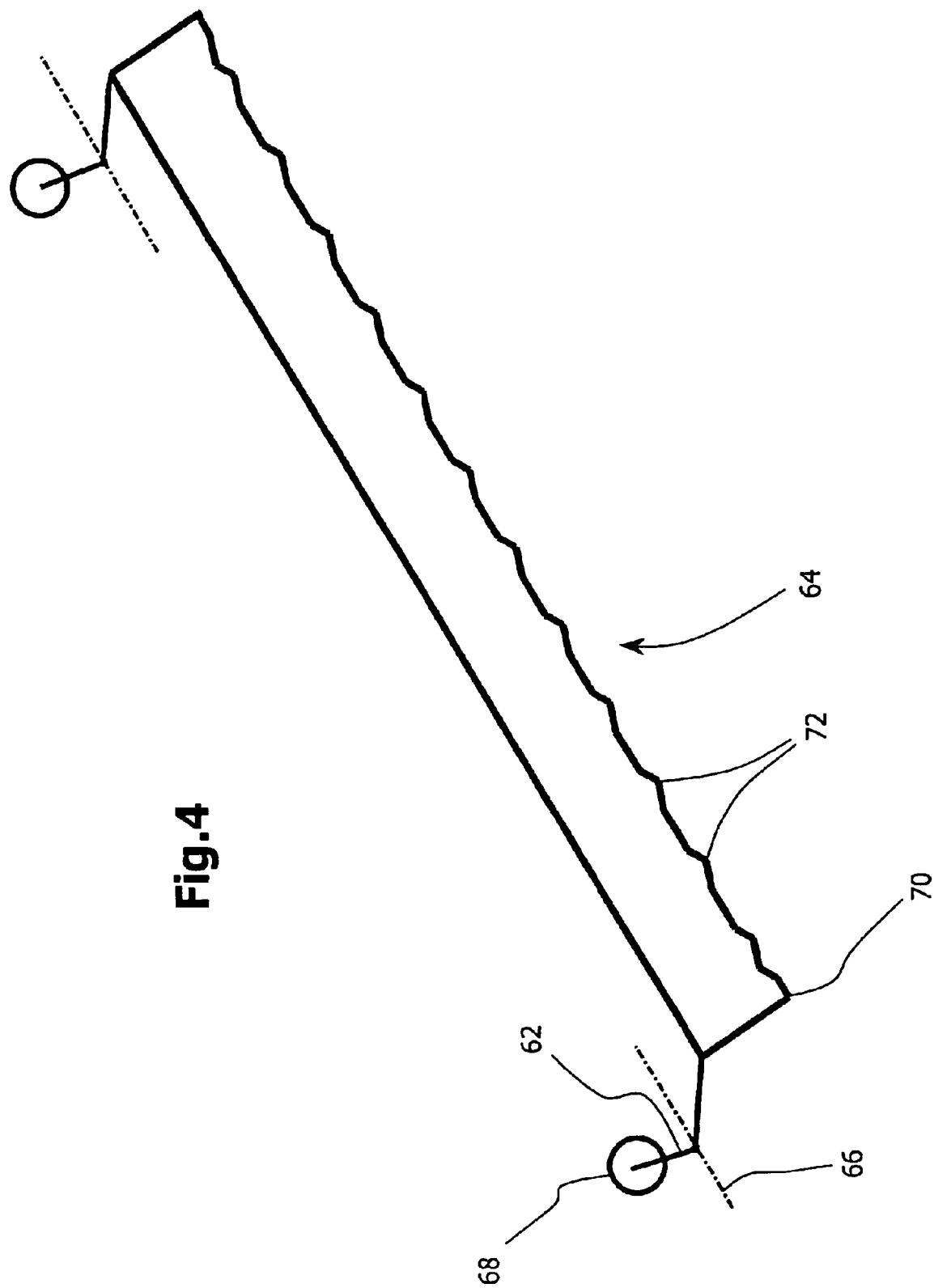

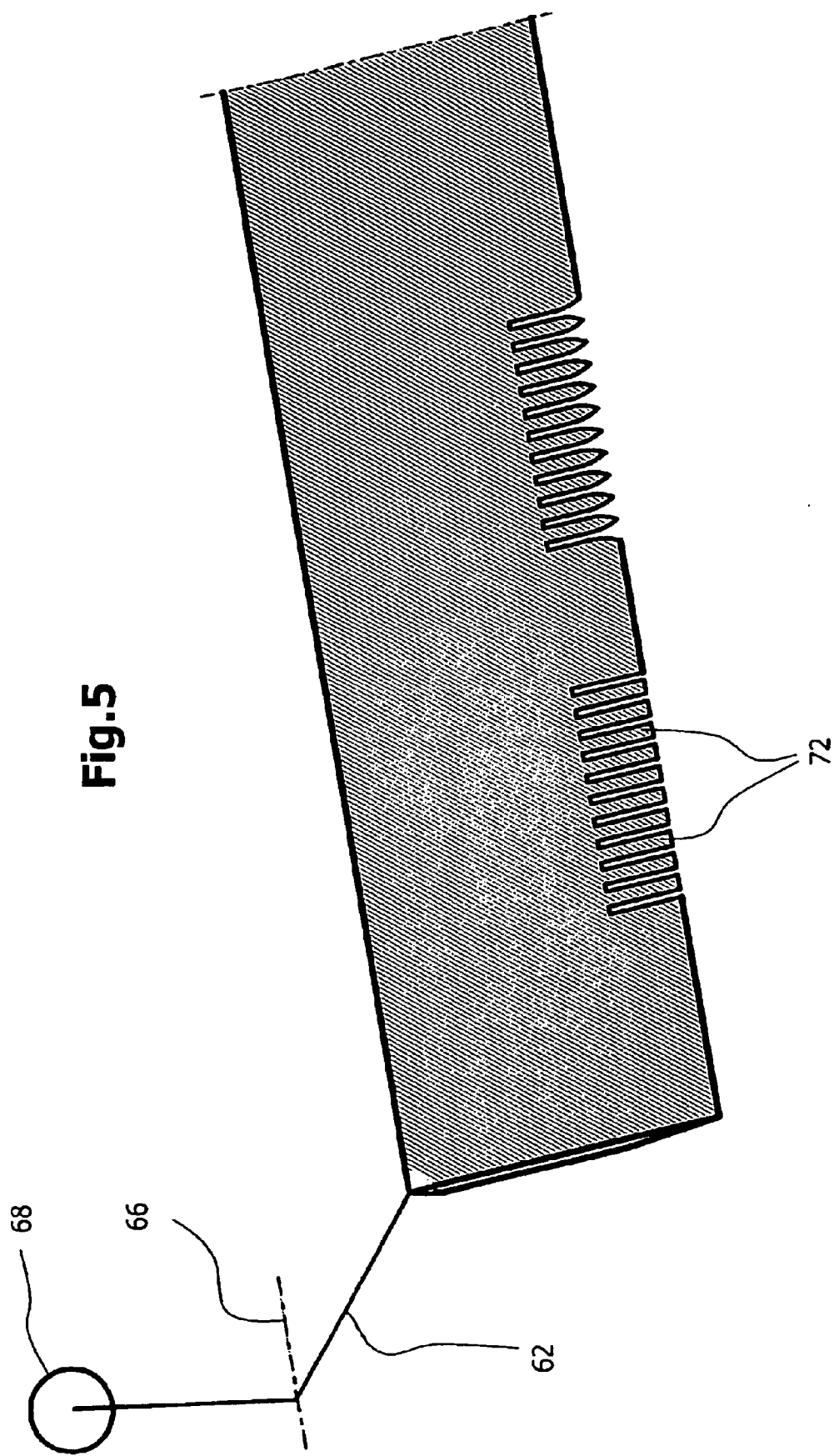

LARGE ROUND BALER

FIELD OF THE INVENTION

The invention concerns a large round baler with a baling chamber that is partially surrounded by baling elements, and with an enveloping arrangement with a separating arrangement and with a withdrawal arrangement to grasp and insert a run of enveloping material in the shape of a broad band into the baling chamber.

BACKGROUND OF THE INVENTION

U.S. Pat. No. 5,581,973 discloses a large round baler with an enveloping arrangement that withdraws net from a net roll by means of a pivot arm and introduces it through a slot between the baling elements into a baling chamber. The pivot arm is equipped with a spring loaded jaw in which the net is guided and retained on the basis of friction.

The problem underlying the invention is seen in the fact that the friction force originating in the net varies on the basis of the condition of the material and is higher or lower with another enveloping material and hence that the material gripping device of the prior art is such that a reliable supply of enveloping material cannot be guaranteed.

SUMMARY OF THE INVENTION

According to the present invention, there is provided an improved device for delivering enveloping material to the baling chamber of a large round baler.

An object of the invention is to provide an enveloping arrangement including a device for grasping a run of enveloping material in a positive safe lock and hence safely, where the run of enveloping material may be a net or foil and where moisture, applied adhesive films, unevenness, and the like do not detract from the reliability of the enveloping arrangement.

Drivers are particularly effective and are configured as teeth, points or the like and thereby can easily penetrate into the run of the enveloping material, or act as a fork in the case where the enveloping material is a net.

If the drivers are configured as suction nozzles, the retaining force as well as the amount of the run of the enveloping material that is drawn into the suction nozzles and the timing of the grasping and release can be varied. If necessary, the release can also be accelerated by compressed air.

Few process steps are required if the take-up of the run of the enveloping material is performed at the same point in time and by the same movement as that which effects its separation from the supply roll at the end of the enveloping process.

If the withdrawal arrangement can be repositioned between a position facing away from the baling chamber and a position facing towards the baling chamber, there is an assurance that it will not be loaded in the non-operating position by material to be baled.

BRIEF DESCRIPTION OF THE DRAWINGS

The drawing shows an embodiment of the invention that shall be described in greater detail in the following.

FIG. 4 is a perspective view of the withdrawal device of the enveloping arrangement.

FIG. 5 is a perspective view of the withdrawal device of FIG. 4, but showing a different driver construction.

DESCRIPTION OF THE PREFERRED EMBODIMENT

Figure 1:
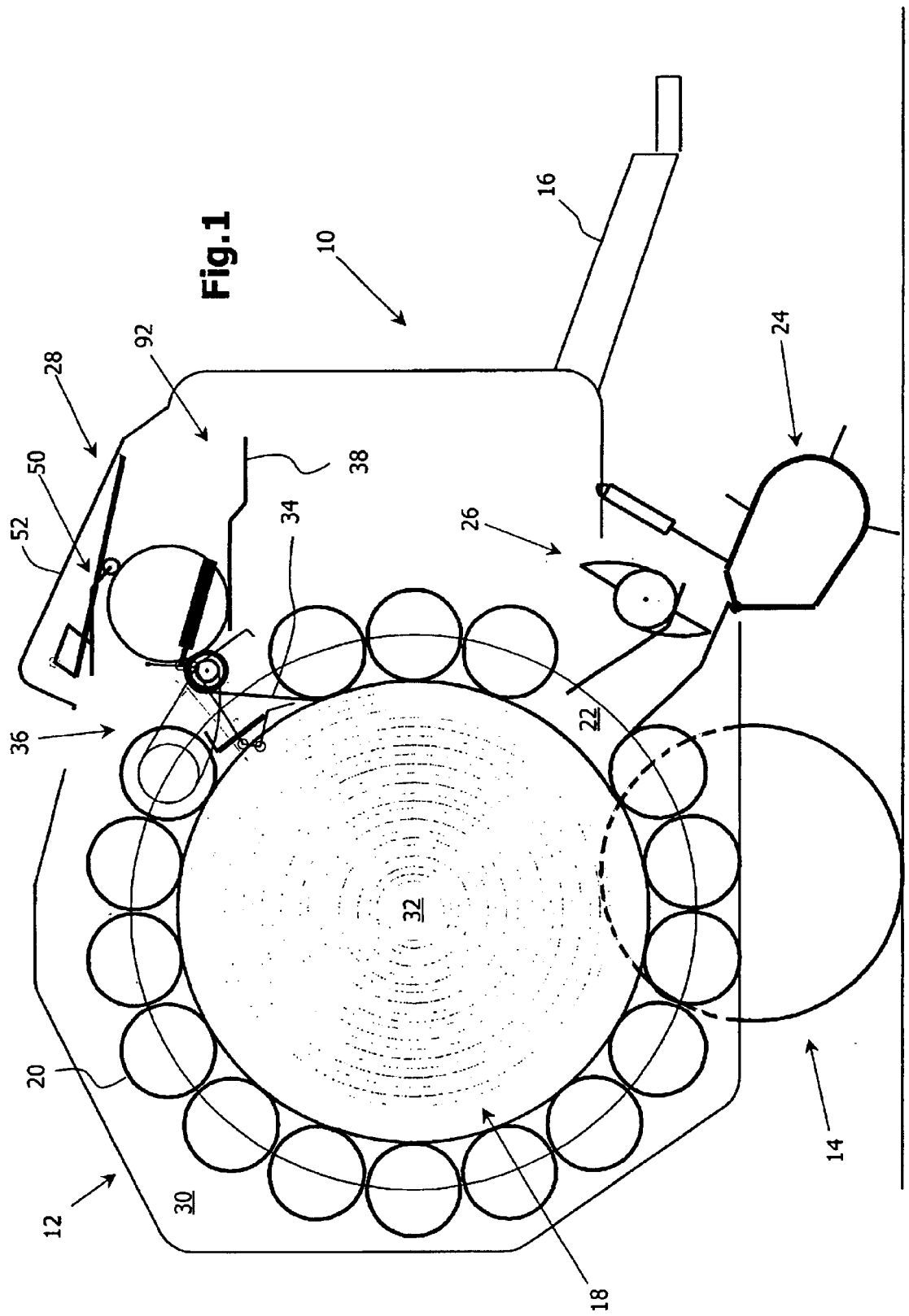
FIG. 1 is a left side perspective view of a large round baler equipped with an enveloping arrangement constructed in accordance with the principles of the present invention.

FIG. 1 shows a large round baler 10 with a frame 12, running gear 14, a towbar 16, a baling chamber 18, baling elements 20, a harvested crop inlet 22, a take-up arrangement 24, a supply arrangement 26, and an enveloping arrangement 28.

Except for the enveloping arrangement 28, the large round baler 10 is of a conventional configuration in which in a baling chamber 18 is defined by the baling elements 20 and the side walls 30, and in which a bale 32 of harvested crop, tobacco, industrial garbage, precious material, etc. is formed and subsequently wrapped with a run of enveloping material 34 configured of net, foil or the like.

The frame 12 holds together the running gear 14, the towbar 16, and the side walls 30, and carries the baling elements 20, the take-up arrangement 24, the supply arrangement 26, and the enveloping arrangement 28.

The baling chamber 18 is covered at its end faces by the side walls 30, and except for the inlet 22 and an opening 36 in its upper forward region, is enclosed around its circumference by the baling elements 20. The opening 36 is provided adjacent to the enveloping arrangement 28 and provides an access to the baling chamber 18 for receiving the enveloping material 34. The bailing chamber 18 can be opened for the delivery of the bale 32, in a known manner, whereby a rear section of the side walls 30 is pivoted upward about an upper bearing, not shown, while a forward section remains rigid. In the embodiment shown, the baling chamber 18 is provided as fixed in its size. Instead, a baling chamber 18 that is variable in its size could also be used, as is also well known.

In this embodiment, the baling elements 20 are configured as steel rolls that can rotate about horizontal axes extending transverse to the direction of operation and arranged along a circular arc. The baling elements 20 border very close to each other, and in the region of the inlet 22 and at the opening 36, there is a spacing that corresponds approximately to the diameter of a baling element 20. Nine baling elements 20 are supported in bearings, free to rotate, in the rear section of the side walls 30 that can be pivoted upward, and seven baling elements 20 are supported in bearings in the forward rigid section, free to rotate. This arrangement of the baling elements 20, however, is meant only as an example. In place of the baling elements 20, belts, bar chain conveyors or a mixture of these and the like could be used in order to surround a fixed or a variable baling chamber 18.

The inlet 22 is used for receiving the supply of the crop to be baled from the take-up arrangement 24, or if available, from a conveyor arrangement that glides further into the baling chamber 18.

The supply arrangement 26 is used only selectively and may be configured as a conveyor as well as a cutting arrangement.

In their forward region 92, the side walls 30 are spaced at a greater distance from each other than in the region of the baling chamber 18.

The large round baler 10 described so far is of conventional configuration.

The enveloping arrangement 28 is used to support, supply, and separate the run of the enveloping material 34 that is applied to its circumferential surface of a formed bale 32, so that the bale 32 does not fall apart after leaving the baling chamber 18. For this purpose, the enveloping arrangement 28 contains a support 38, an enveloping material feed roll 40, a guide arrangement 42, a withdrawal arrangement 44, an actuating arrangement 46, steering arms 48, a contact pressure arrangement 50, and a covering 52.

In this embodiment, the support 38 is configured as a simple sheet metal plate extending in a horizontal plane in the transverse direction in the forward region 92 of the side walls 30 on which a supply roll 54 of the run of enveloping material 34 rests. The support 38 can also be configured in such a way that it can support several supply rolls 54 that it is provided with steps or depressions for their retention in position and the like.

Figure 2:
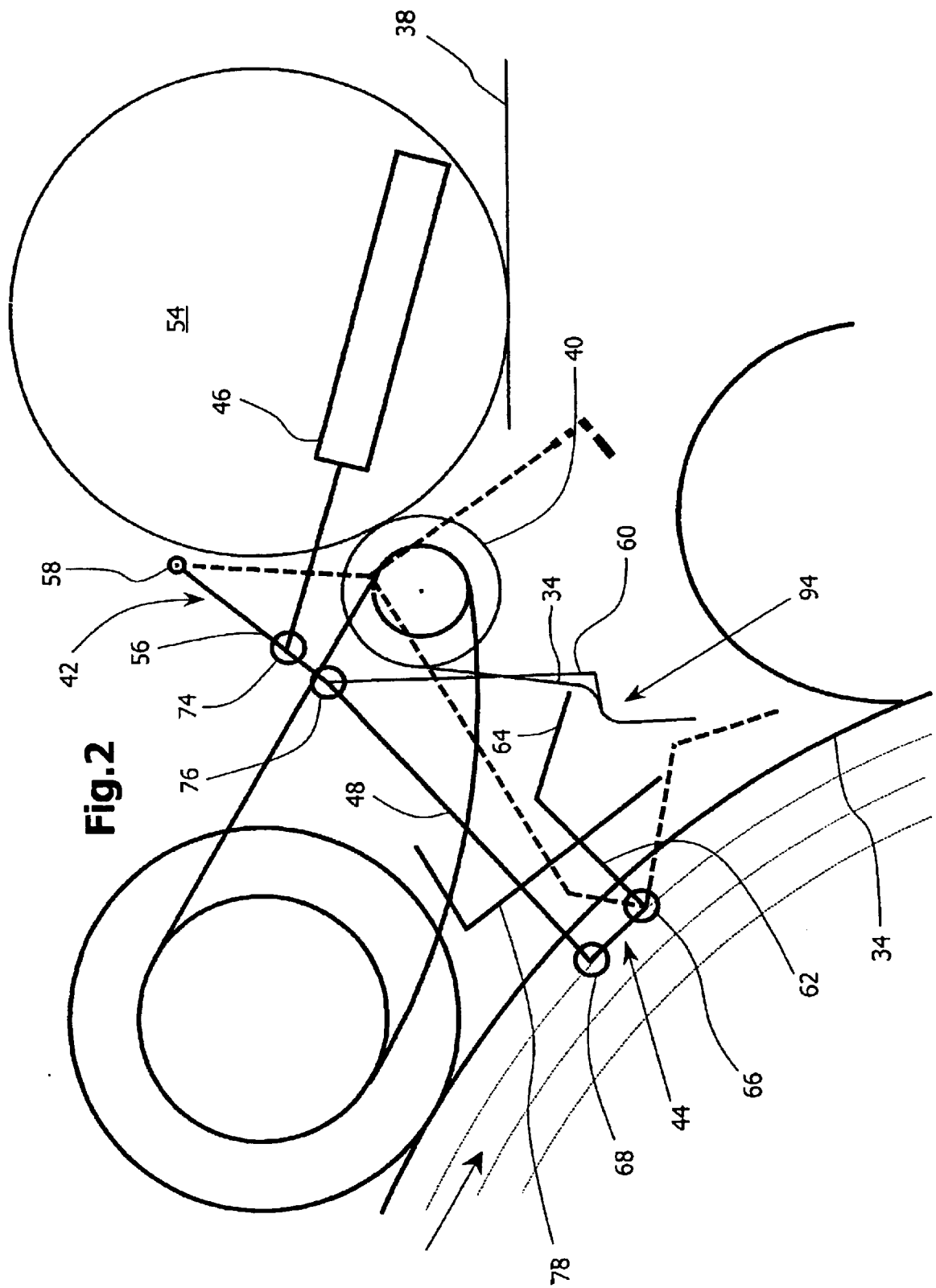
FIG. 2 is an enlarged side view of the enveloping arrangement shown in FIG. 1.

On its circumferential surface, the feed roll 40 is provided with a coating having a high coefficient of friction and can be brought into rotation by means of a drive derived from a baling element 20 or by means of its own drive, for example, by means of an electric or hydraulic motor. Initially, rotation of the feed roll 40 helps to withdraw the run of enveloping material 34 from the supply roll 54 and build up a tension in it during the enveloping process due to a limited rotational movement. The feed roll 40 is located between the support 38 and the opening 36 and rotates about an axis located at a level above the support 38. The supply roll 54 can be brought into contact in its operating position with a region of the roll 40 in the 6 to 9 o'clock position, as seen in FIG. 2, and is held into contact with it by the contact pressure arrangement 50.

The guide arrangement 42 is provided with two arms 56 that are mounted, as by bearings 58 provided in the forward region 92 of the side walls 30, for pivoting vertically about a horizontal axis that is parallel to the axis of rotation of the bale 32. Secured to a lower end region the arms 56 is a contact plate 60 that bridges the entire distance between the arms 56. The contact plate 60 is stiff in bending and forms a part of a separating or cut-off arrangement 94. The spacing between the arms 56 in the sideways direction is large enough for the roll 40 to be accommodated between them. A lower end region of the contact plate 60 is bent towards the baling chamber 18 so as to define a 90° angle, and with its upper edge, maintains a spacing to the circumferential surface of the roll 40. At a point approximately in alignment with a top surface of the roll 40, the arms 56 are bent so that their lower section, in the non-operating position shown in FIG. 2, extend generally in the vertical direction, while the upper section extends at an angle of approximately 30° to the vertical to the rear and inclined towards the bearing 58. The guide arrangement 42 is located in such a way that, particularly in the non-operating condition, it is able to accept the run of the enveloping material 34 arriving over the roll 40 between the arms 56 and permit it to slide over the contact plate 60 to the baling chamber 18.

The withdrawal arrangement 44 is shown in an enlarged view as an individual part in FIGS. 4 and 5 and includes two arms 62 and a sheet metal driver 64.

The arms 62, located at the sides of the withdrawal arrangement 44 generally in the same plane as the arms 56, extend parallel to each other and are provided with two legs extending at an angle of approximately 90°. This means that the arms 62 move outside of the side walls 30 in the region of the baling chamber 18. In the sharp bend between the two legs, the arms 62 are engaged in a bearing 66 at the side walls 30 with a horizontal bearing axis, so as to pivot vertically. In an end region of the arms 62 facing the baling chamber 18, a further bearing 68 is provided, and in the end region facing away from the baling chamber 18, the sheet metal driver 64 is rigidly attached to the arms 62 at an angle of approximately 75°. In the side view of FIG. 2, the arms 62 and the sheet metal driver 64 generally follow the shape of an "S".

The sheet metal driver 64 extends over the entire region between the side walls 30, is configured rigidly in itself, and is at least generally level. The width of the sheet metal driver 64 corresponds to the width of the baling chamber 18. As can best be seen in FIG. 4, the forward side of the driver 64, that is, the side facing the contact plate 60, defines an edge 70 provided with projections 72 having a toothed, a zig-zag or comb-shaped profile. In FIG. 5, a generally equal sheet metal driver 64 is shown that differs from that shown in FIG. 4, only in the shape of the projections 72. Although the sheet metal driver 64 shown in FIG. 5 has two shapes of projections 72, and these may be possible, it is unlikely that such a construction would be used, since it would be more efficient to cut out only one shape of driver. The projections 72 are worked into the sheet metal driver 64 by means of a stamping process, a laser cutting process or other form-giving operating process. The spacing of the projections 72, their width and shape are selected in such a way that they can easily penetrate into a run of enveloping material 34 configured as foil or between the threads of a run of enveloping material configured as net, and can free this after it is supplied into the baling chamber 18. The sheet metal driver 64 forms a second part of the separating arrangement 94.

The arrangement of the sheet metal driver 64 is selected in such a way that the points of the projections 72 come to lie on the contact plate 60 close to its sharp bend when the enveloping arrangement 28 is in its non-operating or waiting position shown in the drawing in solid lines.

In the embodiment shown, the actuating arrangement 46 is configured as an electrically or hydraulically operated linear motor that is supported in bearings at one end on the side walls 30 and that engages with its other end in a bearing 74 on the arms 56 of the guide arrangement 42.

The steering arms 48 are configured as straight struts or rods that extend between a bearing 76 in the region of the sharp bend in the arms 56 and the bearing 68 on the end of the arms 62, and in each case are connected with these, free to pivot.

The contact pressure arrangement 50 and the covering 52 are described in great detail in U.S. patent application Ser. No. 10/377,961, filed 28 Feb. 2003, and are used to retain the supply roll 54 at all times in contact with the feed roll 40 by means of the weight of the covering 52 and to protect the enveloping arrangement 28 against the dirt-laden surroundings.

A sheet metal covering 78 extends between the side walls 30 over a part of the opening 36 and prevents any of the crop to be baled from escaping from the baling chamber 18, during the baling process, but permits the access of the run of wrapping material 34.

On the basis of the foregoing description, the enveloping arrangement 28 according to the invention operates as follows.

Starting with a fully formed bale 32 being located in the baling chamber 18, as shown in FIG. 1, an enveloping process can then begin. The enveloping arrangement 28 assumes the solid-line position shown in FIG. 2, but is not yet operating. The run of enveloping material 34 is wrapped around a supply roll 54 resting on the support 38, and a partial section withdrawn from it lies upon the feed roll 40 and the contact plate 60, and reaches slightly beyond the contact plate 60. The points of the projections 72 engage the contact plate 60 and penetrate through the run of enveloping material 34. The actuating arrangement 46 is extended and the feed roll 40 is not in operation.

If the enveloping process is to be initiated from this non-operating condition, the actuating arrangement 46 is retracted, which has the effect that the guide arrangement 42 pivots downward in counterclockwise direction about the bearing 58 and thereby moves the contact plate 60 away from the projections 72. Due to the connection over the steering arms 48, the withdrawal arrangement 44 will also pivot downward in the clockwise direction about the bearing 66 and carry along the run of the enveloping material 34 it was hooked into. Simultaneously, the roll 40 is brought into rotation and thereby supports the advancing movement of the run of the enveloping material 34. Following this, the roll 40 is braked so that it applies a braking force to the run of the enveloping material 34 in order to apply tension to it during the process. When the withdrawal arrangement 44 or the points of the projections 72 have reached their end position, the end of the run of enveloping material 34 is in the region of the circumferential surface of the bale 32 that is rotating in the baling chamber 18, by which it is grasped and is carried along. This end position is made clear by the thin dashed lines in the drawing. As soon as the run of enveloping material 34 is grasped by the stalks projecting above the circumferential surface of the bale 32, it is carried along by it until an adequate covering is attained. This is the case after approximately two rotations of the bale 32. The wrapping or enveloping process is ended by extending the actuating arrangement 46, whereby the withdrawal arrangement 44 moves towards the contact plate 60 in the counter-clockwise direction, which then pivots in the clockwise direction. Thereby, the edge 70 or the projections 72 formed in it presses the run of enveloping material 34 against the surface of the contact plate 60, retains it there, and produces a tension in it that finally leads to its tearing off. In this situation the contact plate 60 and the sheet metal drivers 64 interact and operate as the separating arrangement 94. The run of enveloping material 34 will tear along an irregular line and will hang over the edge of the contact plate 60. In this condition, the drive of the feed roll 40 is also turned off again.

Figure 3:
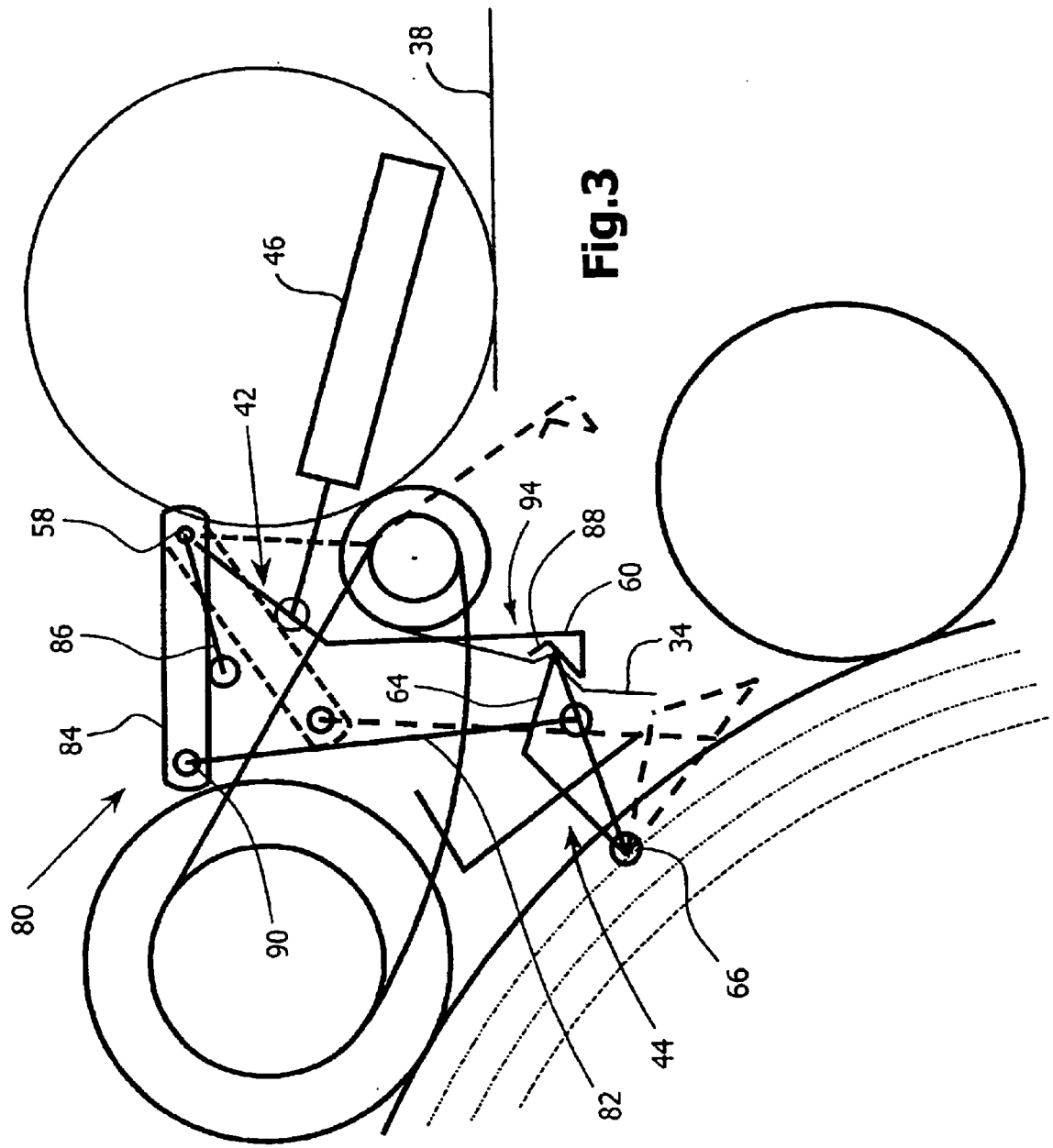
FIG. 3 is a view similar to that of FIG. 2, but showing a second embodiment of the enveloping arrangement.

FIG. 3 shows an embodiment of the enveloping arrangement 28 that deviates slightly from that shown in FIG. 2, but follows the same principle. In place of the steering arm 48, a steering arm system 80 is provided that includes a first steering arm 82 and a second steering arm 84, and that can be loaded by a driver 86.

A further difference lies in the fact that the contact plate 60 contains an L-shaped retaining angle 88 that extends parallel to its lower edge, and that lies upon the lower bent leg of the contact plate 60 at an angle of approximately 45° so that its corner touches the contact plate 60.

The first steering arm 82 engages with one end in the region of the sheet metal driver 64, free to pivot, with the shortened arms 62 that furthermore can pivot about the bearing 66. At its other end, the first steering arm 82 is connected in a joint in a bearing 90 with an end region of the second steering arm 84. The other end region of the second steering arm 84 engages the bearing 58, free to pivot, about whose region the guide arrangement 42 pivots.

The driver 86 is connected, torsionally rigid, with the guide arrangement 42 and is in contact with the underside of the second steering arm 86 between its end regions. Accordingly, a downward pivoting movement of the guide arrangement 42 also brings about a downward movement of the driver 86, which the second steering arm 84 can follow about the bearing 58 on the basis of the force of gravity acting on the withdrawal arrangement 44. On the other hand, at the end of the enveloping process and during the separation, there occurs an active effect of the driver 86 upon the underside of the second steering arm 84 which forces the latter to pivot upward and thereby to bring the withdrawal arrangement 44 into contact with the contact plate 60.

Having described the preferred embodiment, it will become apparent that various modifications can be made without departing from the scope of the invention as defined in the accompanying claims.

What is claimed is:

1. In a large round baler including a baling chamber having opposite ends defined by upright side walls spaced from each other in a direction transverse to a direction of travel of said baler, and having a periphery that is defined by baling elements extending transversely between said side walls and disposed so as to provide an access opening for receiving enveloping material, said baler further including an enveloping arrangement located exteriorly of said baling chamber and adjacent said access opening, and having a separating arrangement and an enveloping material withdrawal arrangement for grasping and inserting a run of enveloping material, in the shape of a broad tape, into said access opening of said baling chamber, the improvement comprising: said withdrawal arrangement including a transversely extending, elongate driver forming a part of said separating arrangement and having projections spaced along its length; and said driver being mounted for movement with said withdrawal arrangement between a first position, wherein said projections are caused to penetrate into the surface of, and hold, said run of enveloping material during a separating operation, and a second position, spaced toward said baling chamber from said first position to a location adjacent an outer periphery of said baling chamber, during the initiation of an enveloping operation.

2. The large round baler, as defined in claim 1, wherein said withdrawal arrangement is mounted such that it can be repositioned between one position, corresponding to said first position of said driver, so as to orient said driver such that said projections extend away from said baling chamber, and another position, corresponding to said second position of said driver, so as to orient said driver such that said projections extend approximately towards said periphery of said baling chamber.

3. In a large round baler including a baling chamber having opposite ends defined by upright side walls spaced from each other in a direction transverse to a direction of travel of said baler, and having a periphery that is defined by baling elements extending transversely between said side walls and disposed so as to provide an access opening for receiving enveloping material, said baler further including an enveloping arrangement located exteriorly of said baling chamber and adjacent said access opening, and having a separating arrangement and an enveloping material withdrawal arrangement for grasping and inserting a run of enveloping material, in the shape of a broad tape, into said access opening of said baling chamber, the improvement comprising: said withdrawal arrangement including a transversely extending, elongate driver having projections spaced along its length; and said driver being mounted for movement for causing said projections to penetrate into the surface of said run of enveloping material; said separating arrangement including a contact plate located so as to be in a path of movement of said withdrawal arrangement; and said withdrawal arrangement being moveable into contact with said run of enveloping material for moving it against said contact plate so as to effect separation of said enveloping material at said contact plate.

4. The large round baler, as defined in claim 3, wherein an actuator is coupled for effecting simultaneous movement of said withdrawal arrangement and said contact plate, and for selectively bringing them into contact with each other once a bale located in said baling chamber has been enveloped with said enveloping material.

* * * * *